US010264770B1

(12) United States Patent
Morales

(10) Patent No.: US 10,264,770 B1
(45) Date of Patent: Apr. 23, 2019

(54) METHOD OF FORMING A FLEXIBLE FISHING LURE HAVING SCENT POWDER AND FISHING LURE MADE THEREFROM

(71) Applicant: Lure Maker LLC, Phoenix, AZ (US)

(72) Inventor: Robert Morales, Phoenix, AZ (US)

(73) Assignee: Reel Scents, LLC, Flagstaff, AZ (US)

( * ) Notice: Subject to any disclaimer, the term of this patent is extended or adjusted under 35 U.S.C. 154(b) by 308 days.

(21) Appl. No.: 15/254,182

(22) Filed: Sep. 1, 2016

Related U.S. Application Data

(60) Provisional application No. 62/213,212, filed on Sep. 2, 2015, provisional application No. 62/242,717, filed on Oct. 16, 2015.

(51) Int. Cl.
A01K 85/01 (2006.01)
B29B 13/06 (2006.01)
B29C 39/00 (2006.01)
B29C 39/10 (2006.01)
B29B 13/10 (2006.01)
B29K 105/16 (2006.01)
B29L 31/00 (2006.01)

(52) U.S. Cl.
CPC .............. A01K 85/01 (2013.01); B29B 13/06 (2013.01); B29B 13/065 (2013.01); B29B 13/10 (2013.01); B29C 39/003 (2013.01); B29C 39/10 (2013.01); B29K 2105/16 (2013.01); B29L 2031/7002 (2013.01)

(58) Field of Classification Search
CPC ...... A01K 85/01; B29B 13/06; B29B 13/065; B29B 13/10; B29C 39/003; B29C 39/10; B29K 2105/16; B29L 2031/7002
See application file for complete search history.

(56) References Cited

U.S. PATENT DOCUMENTS

| 2,718,033 | A | * | 9/1955 | Burke | A01K 85/00 264/255 |
| 7,998,394 | B1 | * | 8/2011 | Jones, Jr. | A01K 85/00 264/319 |
| 2004/0018272 | A1 | * | 1/2004 | Chen | A01K 85/01 426/1 |
| 2008/0263934 | A1 | * | 10/2008 | Hanson | A01K 85/00 43/42.06 |
| 2012/0055316 | A1 | * | 3/2012 | Smith | A01K 85/00 84/404 |

* cited by examiner

Primary Examiner — Ryan A Reis
(74) Attorney, Agent, or Firm — Invention To Patent Services; Alex Hobson

(57) ABSTRACT

A powder scented fishing lure has a substantially uniform dispersion of scent powder throughout the body of the lure. The scent powder is a screened scent powder having no particles greater than about 400 microns. The powder scented fishing lure has a prolonged release of the scent during use and has no substantial reduction in mechanical durability as a result of the addition of the scent powder. The powder scented fishing lure may be in any suitable shape, size and color and enables unique attractant properties over conventional plastic fishing lures.

14 Claims, 10 Drawing Sheets

METHOD OF FORMING A FLEXIBLE FISHING LURE HAVING SCENT POWDER AND FISHING LURE MADE THEREFROM

CROSS REFERENCE TO RELATED APPLICATIONS

This application claims the benefit of U.S. provisional patent application No. 62/213,212, filed on Sep. 2, 2015, and U.S. provisional patent application No. 62/242,717, filed on Oct. 16, 2015, both entitled Method of Forming A Flexible Fishing Lure Having Scent Powder And Fishing Lure Made Therefrom; the entirely of both are hereby incorporated by reference herein.

BACKGROUND OF THE INVENTION

The present invention is directed to a method of forming a flexible fishing lure, in particular a plastic fishing lure, having scent particles derived from live plants or animals embedded therein and fishing lures made therefrom.

BACKGROUND

Plastic fishing lures come in many different shapes, colors and varieties and are widely used as a primary fishing lure in fishing competitions. Anglers often select plastic fishing lures that resemble bait species common to the area they are fishing. For example, in areas where fish feed on crawfish, an angler may select a crawfish shaped plastic fishing lure. Some anglers will dip plastic fishing lures in a scent oil or liquid in an attempt to further entice fish to strike the artificial bait. These liquid scents quickly wash off of the slick plastic fishing lure and loose effectiveness. In addition, handling a separate container of liquid scent is difficult and often leads to the liquid scent being spilled on the angler's clothes, hands, boat and within their tackle box. These liquid scents have a very strong odor and spilling the scent liquid can leave articles having a foul odor for a long period of time. In addition, the liquid scents can be slippery making it more difficult to manipulate a lure onto a jig-head or hook.

There exists a need for a plastic fishing lure that can release a scent over a long period of time and does not pose the risk of contaminating the angler or their equipment through spilling.

SUMMARY OF THE INVENTION

The invention is directed to a flexible fishing lure, in particular a plastic fishing lure, having scent particles derived from live plants or animals incorporated therein and a method of forming said fishing lure.

A method of forming a powder scented plastic fishing lure comprises the steps of providing a scent material, providing a moldable thermoplastic, forming the scent material into a screened powder through drying, grinding and screening and combining with heated moldable thermoplastic to form a combined or composite material. The composite material may then be used to fill a fishing lure mold, such as a worm. After cooling the mold, a powder scented plastic fishing lure is produced. A method may further comprise the addition of a secondary polymeric material having a different polymeric composition than the primary moldable thermoplastic that reinforces the powder scented plastic fishing lure.

A scent material may be derived from a plant or animal. Animal derived scent material may be more preferred as they may produce a stronger smell and more effectively entice a fish to strike the lure. Scent material may be derived from any variety of live animal including but not limited to fish including shad, anchovy, salmon, mackerel, as well as worms including night crawlers, red wigglers and meal worms, as well as shiners, leeches, maggots, squid, octopus, crawfish, shell-fish, animal meat, organs and/or bone including beef and or chicken meat and/or liver or other organs, and the like. It may be best to select a scent material that is common as a feeding species, such as shad. The scent may be derived from plants and include, but are not limited to, plant leaf, flower, fruit, stem, trunk or root components and may be derived from coffee beans.

The scent material is dried, ground and screened to produce a screened scent powder. A scent material may be dried through any conventional means however in a preferred embodiment, the scent material is sun dried. Scent material, such as shad or any other variety of fish, may be placed on corrugated substrate, such as metal or plastic and located in directed sunlight. This lower temperature drying process may preserve more of the scent in the dried material. Drying at high temperatures can chemically change the scent material and may diminish the scent. In a sun drying process the temperature during the drying step may not exceed 150° F. (65.5° C.), or 130° F. (54.4° C.), or 120° F. (48.9° C.) or 100° F. (37.8° C.). It is preferred to remove substantially all of the moisture to ensure that the scent material will grind properly without dumping, such as to less than about 5% by weight of moisture. In an exemplary embodiment, the scent material is dried until it contains less than about 10% moisture, or even more preferred less than about 5% moisture and even more preferred, less than about 2% moisture, or less than 1% moisture by weight. It is very important, especially for the fine particle sizes described herein that the moisture level be very low, such as less than 2% by weight. The percentage moisture of the scent material may be determined through Thermal Gravimetric Analysis (TGA), Instrument Specialist Inc., Twin Lakes Wis., or by weighing the material, baking in an oven at 150° C. for one hour and then re-weighing the material. In some embodiments, the scent material is broken into smaller pieces as the material is being dried.

The scent material is coarse ground using any suitable method including a spinning blade processor or grinder, a tumbler, mill or the like. In an exemplary embodiment, the scent material is placed in a food processor and is ground by the rotating blades.

The coarse ground scent material is fine ground after the coarse grinding step. Any suitable method to produce fine ground scent material may be employed. In an exemplary embodiment, a commercial spice grinder is used to produce a scent powder that has an average particle size of less than about 350 microns. The size of the powder may be important in producing a lure that has a combination of sustained scent release and good durability or tensile strength. If the scent powder is too large, the surface area per gram of the material, or specific surface area, may not provide long term scent release and the larger particles may produce weak areas within the lure that result in the lure breaking or splitting. Large scent particles may result in air gaps around the particles which will weaken the lure. It is important to produce a scent powder that has no large particles. A mono-modal particle size with no particles above a predetermined size is preferred.

The fine ground scent powder is screened to remove any of the particles that are larger than the screen opening. In an exemplary embodiment, a 50 mesh screen or larger (smaller opening size), such as a 60 or 70 mesh, is used to produce a screened scent powder. In an exemplary embodiment, the screened scent powder contains substantially no particles having a size larger than about 350 microns, larger than about 300 microns, or larger than about 250 microns. In a more preferred exemplary embodiment, a 100 mesh screen or larger (smaller opening size), is used to produce a screened scent powder that is no larger than 150 microns. As described, ensuring that any large particles are removed is important to ensure that the lure is mechanically durable. Table 1 provides a list of mesh sizes and the particle sizes that will fit through the screen. Any of these mesh meshes may be used to produce a fine screened scent powder having a particle size no larger than the sizes provided in Table 1.

TABLE 1

Mesh Sizes

| US Mesh | Microns | Millimeters |
| --- | --- | --- |
| 18 | 1000 | 1 |
| 20 | 841 | 0.841 |
| 25 | 707 | 0.707 |
| 30 | 595 | 0.595 |
| 35 | 500 | 0.500 |
| 40 | 400 | 0.400 |
| 45 | 354 | 0.354 |
| 50 | 297 | 0.297 |
| 60 | 250 | 0.250 |
| 70 | 210 | 0.210 |
| 80 | 177 | 0.177 |
| 100 | 149 | 0.149 |
| 120 | 125 | 0.125 |
| 140 | 105 | 0.105 |
| 170 | 88 | 0.088 |
| 200 | 74 | 0.074 |

The screened scent power is then combined with a heated moldable thermoplastic. Moldable thermoplastic is available from M-F Manufacturing Company, Fort Worth, Tex., and Calhoun Plastics and Chemicals Inc., Calhoun, Ga., for example. Any suitable plastic may be used including, but not limited to, polyvinylchloride (PVC), urethane, silicone, polyethylene, copolymers and the like. In addition, a powder scented lure, as described herein, may comprise a rubber component, such as a natural rubber, or consist essentially of a rubber and the scent powder. The plastic used in the present invention produces a soft and flexible fishing lure. A flexible body of the flexible fishing lure, as described herein, is soft and often is formed with a tail that is configured to move or flutter as the lure is pulled through the water. This motion attracts fish and makes the flexible fishing lure appear to be a live bait for the fish. A flexible body of a flexible fishing lure, as described herein, is soft and has a shore A hardness of no more than about 70 and more preferably no more than about 60 and even more preferably no more than about 40. A soft flexible body is preferred as it is easier to manipulate a hook therethrough and will more readily have motion when being moved through the water. The class of fishing lures described herein is often referred to as plastics by anglers. The flexible body of the flexible fishing lure will readily bend along the length and is not free standing along the length in most embodiments, except for very short lure bodies. The molecular weight of the moldable thermoplastic may be from about 50,000 to 100,000, and for the soft flexible lures may be between about 20,000 and 80,000 or in some cases between about 20,000 and 50,000 and any range between and including the values provided.

In an exemplary embodiment, a second polymeric material is added to the moldable thermoplastic to reinforce the moldable thermoplastic. A secondary polymeric material may have a different chemical structure and be a completely different type of plastic from the moldable thermoplastic. The secondary polymeric material may have a higher molecular weight than the moldable thermoplastic, such as about double of more, five times or more, ten times or more, 100 times or more, 1000 times or more and any range between and including the molecular weight ratios provided. The secondary polymeric material may be a thermoplastic, a thermoset, or cross-linked polymeric material including, but not limited to, polyvinylchloride (PVC), urethane, silicone, polyethylene, polyethylene, polypropylene as well copolymers. The secondary polymeric material may be added to the moldable thermoplastic prior to or during the heating step to allow the secondary polymeric material to substantially disperse throughout the moldable thermoplastic. The secondary polymeric material may be added in a concentration by weight of the final composite lure, including the moldable thermoplastic, scent powder, and the secondary polymeric material, glitter, dye and the like, to effectively reinforce the composite lure without substantially stiffening the lure and may be added in a concentration of about 30% by weight of the composite or less, about 20% or less, about 10% or less and any range between and including the weight percentages provided.

The moldable thermoplastic and/or composite of the moldable thermoplastic and secondary polymeric material, is heated to a temperature to melt the plastic so that the screened scent powder can be dispersed within the melted liquid plastic. The screened scent power is substantially uniformly dispersed throughout the melted plastic. The screened scent powder may be added in a concentration to provide sustained scent release during use and below a concentration that will substantially reduce the mechanical durability of the fishing lure. In an exemplary embodiment, the screened scent powder is combined with the melted liquid plastic in a concentration of at least about 0.01 g per gram of heat moldable thermoplastic. In a more preferred embodiment, the screened scent powder is combined with the melted liquid plastic in a concentration between 0.02 g and 0.25 g per gram of heat moldable thermoplastic. And in an even more preferred embodiment, the screened scent powder is combined with the heated moldable thermoplastic in a concentration of between about 0.05 g and 0.15 g per gram of heat moldable thermoplastic. It is to be understood that the scent powder may be added to the plastic material prior to it melting, however, to best preserve the scent it is preferred to add the scent just prior to molding the lure. Scent material heated in the molten thermoplastic for too long may lose effectiveness.

In an exemplary embodiment, the delay time, or the time between adding the scent powder to the molten plastic and filling a mold with the combined or composite material, is kept to a minimum such as no more than 15 minutes, no more than 10 minutes, no more than 5 minutes, no more than 2 minutes and any range between and including the delay times provided. A low delay time may ensure that the scent powder remains effective and is not overheated prior to being incorporated into a fishing lure. The moldable thermoplastic may be heated to a temperature to ensure good flow and processing of the plastic into the mold and may be heated to a temperature greater than 250° F., greater than 300° F., greater than 350° F. or even greater than 400° F. In an exemplary embodiment, the plastic is not heated to more than 400° F. to ensure that the plastic does not char or burn and to keep the scent material from overheating and loosing effectiveness.

The powder scented molten plastic is then added to a fishing lure mold and substantially fills the fishing lure mold. After the powder scented plastic cools in the mold, a powder scented fishing lure is produced. The fishing lure will release the scent material into the water over an extended period of time and in many cases over the life of the fishing lure. In addition, the fine particle size and screened powder used in the lure ensures no substantial reduction in mechanical durability. For example, a fishing lure made with the same plastic without the addition of the screened scent powder will have a tensile break strength that is substantially the same as the tensile break strength of a powder scented fishing lure as described herein.

Any suitable shape and type of fishing lure mold and fishing lure produced therefrom may be employed in the present invention. Some typical shapes are worms with straight tails, worms or grubs with curly tails, worms or grubs with double tails, crawfish, salamanders, minnows, fish, frogs, ells insects and the like.

In an exemplary embodiment, the powder scented plastic fishing lure consists essentially of a moldable thermoplastic and said scent power, and may comprise a colorant that is added to produce any desired color and/or glitter to reflect light and further entice a fish to strike the fishing lure. A powder scented fishing lure may be opaque or translucent.

In an exemplary embodiment, a skirt for a fishing lure is made from the powder scented plastic, as described herein. The lure may be a jig type lure, a spinner type lure or a chugger type ocean fishing lure. In an exemplary embodiment a plurality of all of the strands of the skirt are made from or comprise the powder scented plastic as described herein.

In an exemplary embodiment, the powder scented plastic fishing lure is an over-molded fishing lure, wherein the scented plastic is molded over a rigid hard component of the fishing lure, such as the body, head of the lure, spinner, bill, hooks and the like. The over-molded scented plastic may a higher concentration of scent particles as it does not require the same strength requirements as a lure or portion of a lure made completely out of the powder scented plastic, such as between about 0.5 g and 0.35 g per gram of plastic or plastic composite. Any portion of a lure may be over-molded including, but not limited to, the body, head, tail, hooks, bill, spinner, connectors, and the like.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
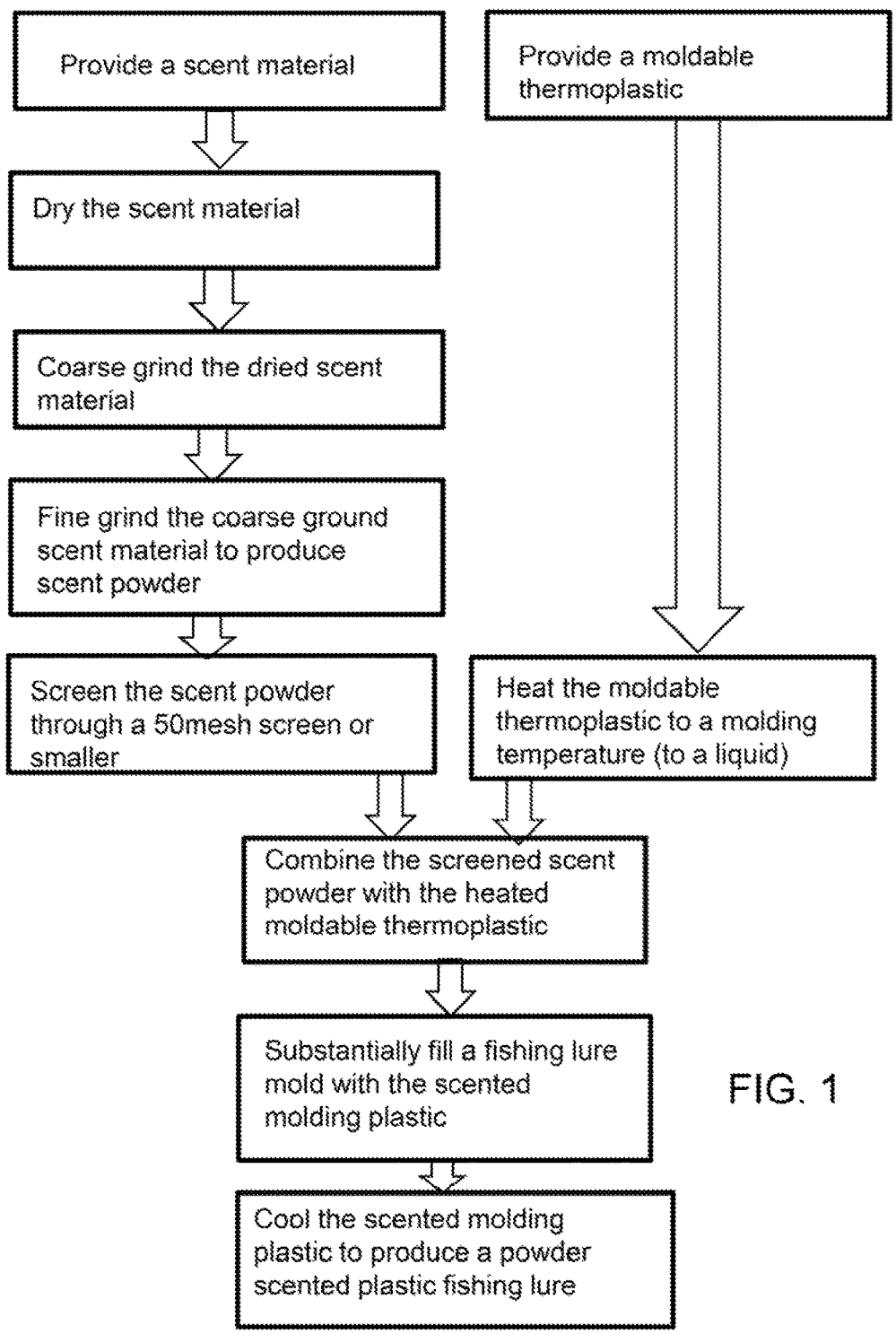

FIG. 1 shows a flow chart of an exemplary method of forming an exemplary powder scented fishing lure.

Figure 2:
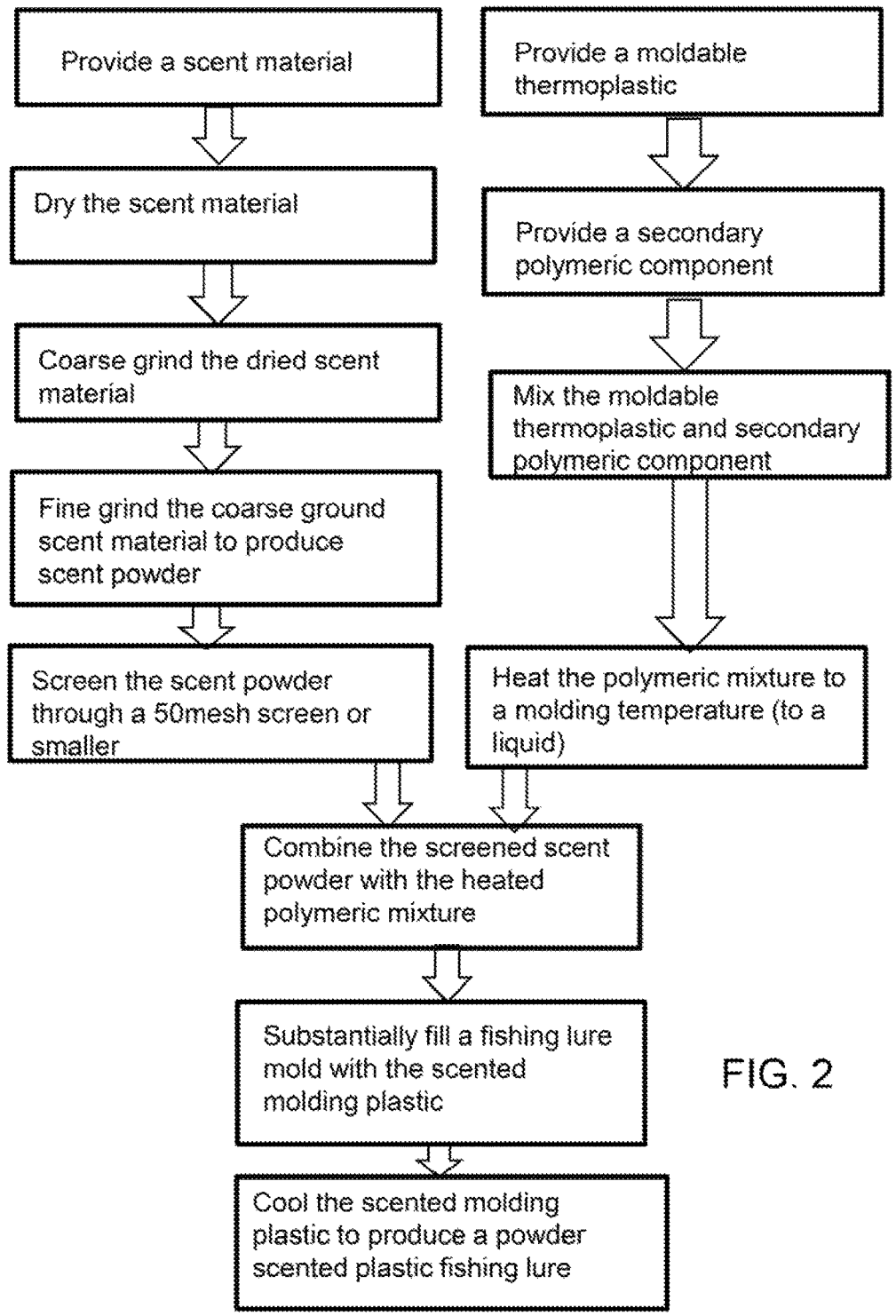

FIG. 2 shows a flow chart of an exemplary method of forming an exemplary powder scented fishing lure.

Figure 3:
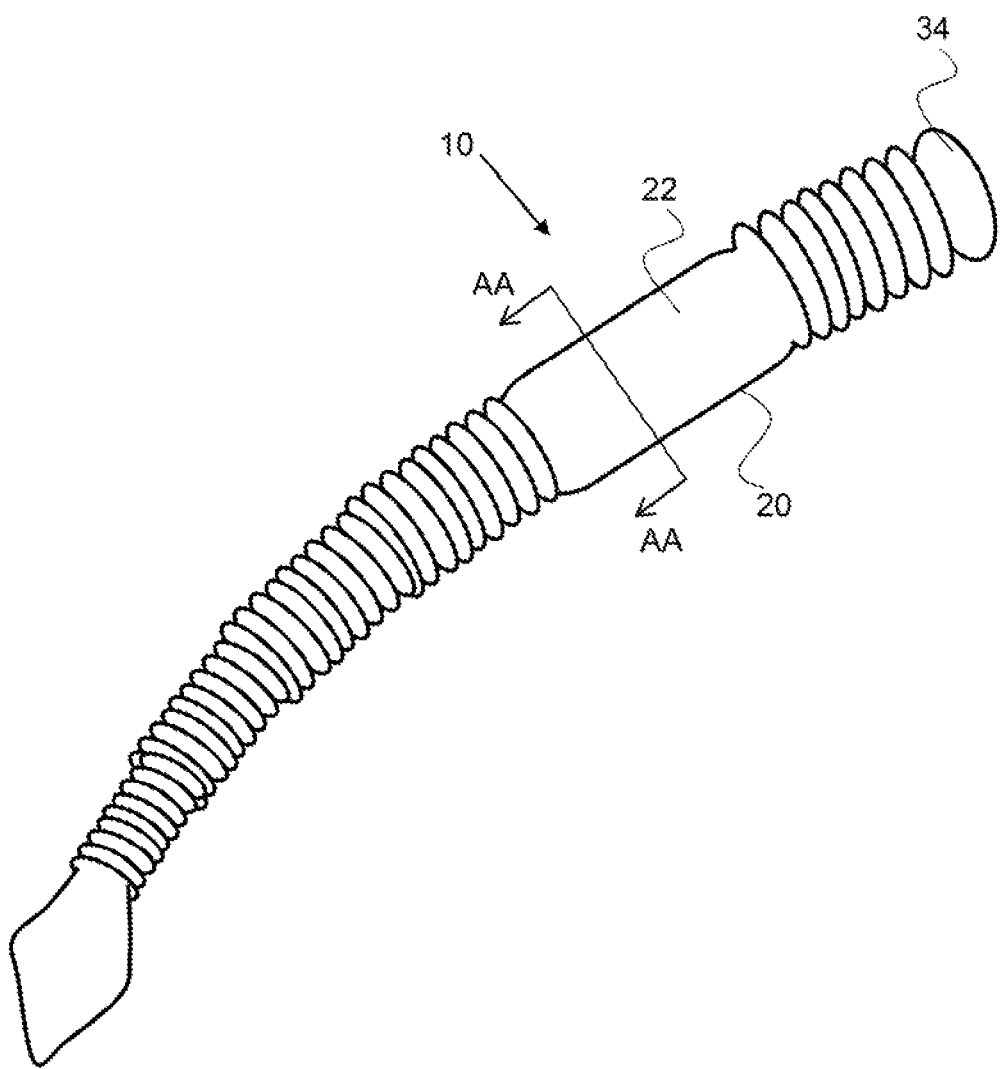

FIG. 3 shows an exemplary powder scented plastic fishing lure lure in the shape of straight tall worm.

Figure 4:
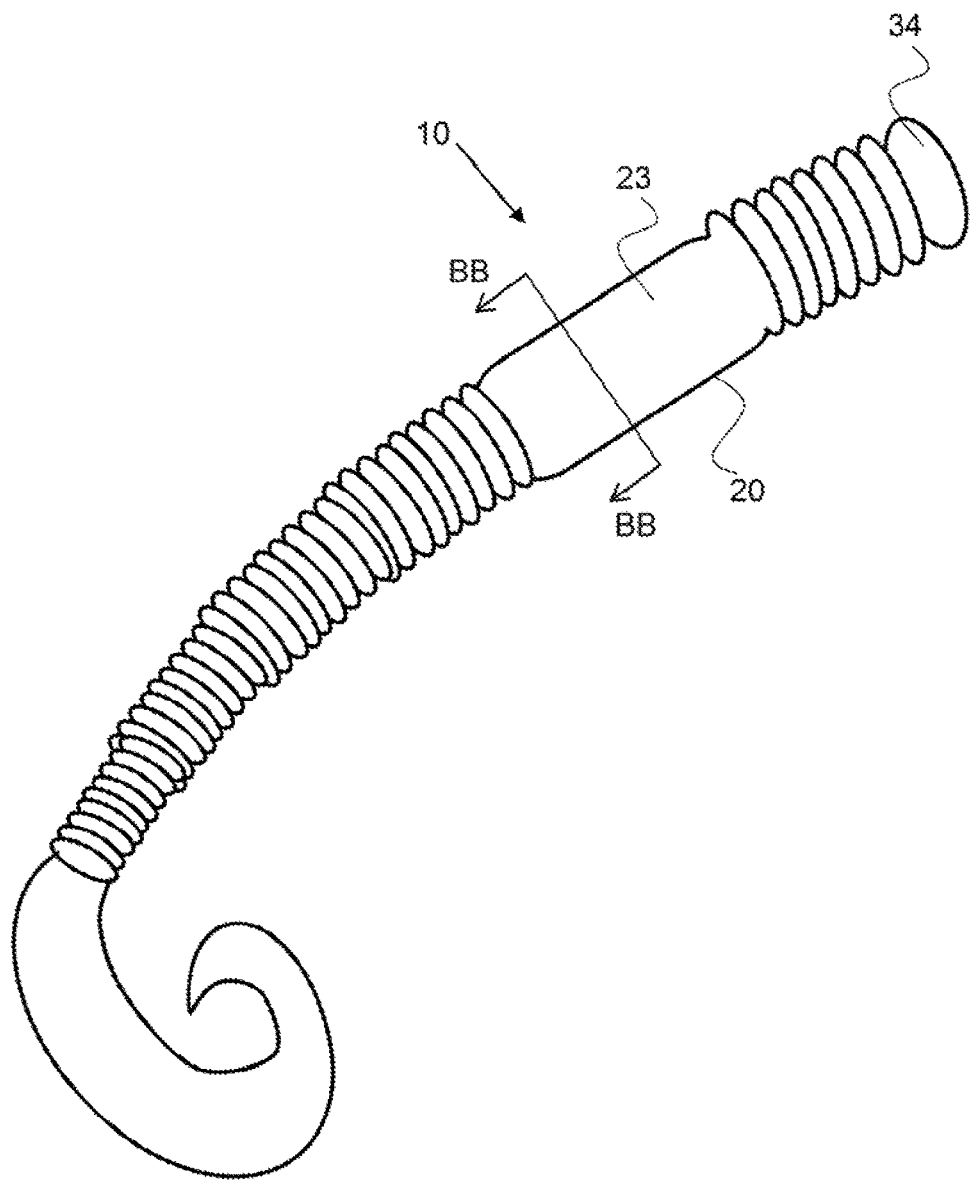

FIG. 4 shows an exemplary in the shape of curly tail worm.

Figure 5:
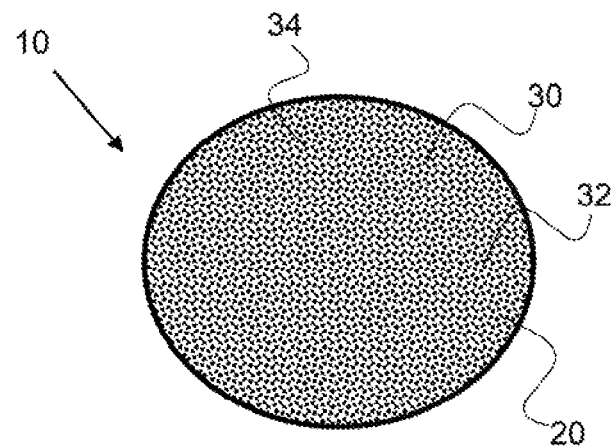

FIG. 5 shows a cross-section view taken along line AA of FIG. 2 having the scent powder substantially dispersed throughout the body of the fishing lure.

Figure 6:
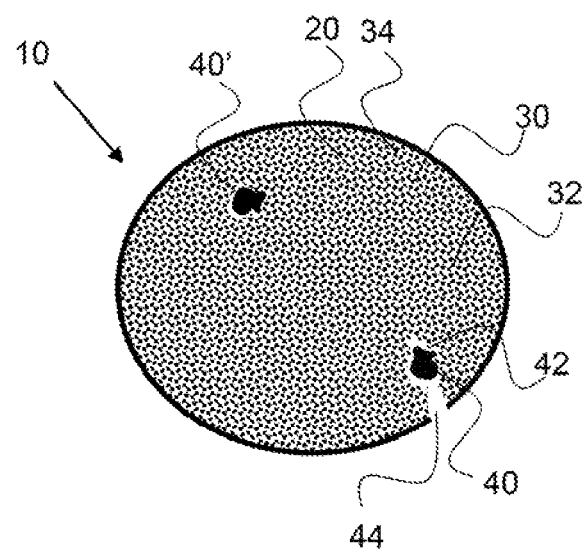

FIG. 6 shows a cross-section view taken along line BB of FIG. 3 having a non-screened scent powder dispersed throughout the body of the fishing lure and larger particles that compromise the mechanical durability of the lure.

Figure 7:
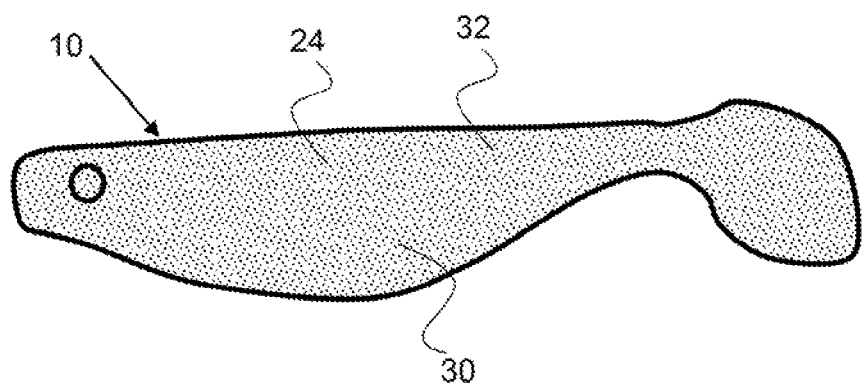

FIG. 7 shows an exemplary powder scented plastic fishing lure in the shape of a fish.

Figure 8:
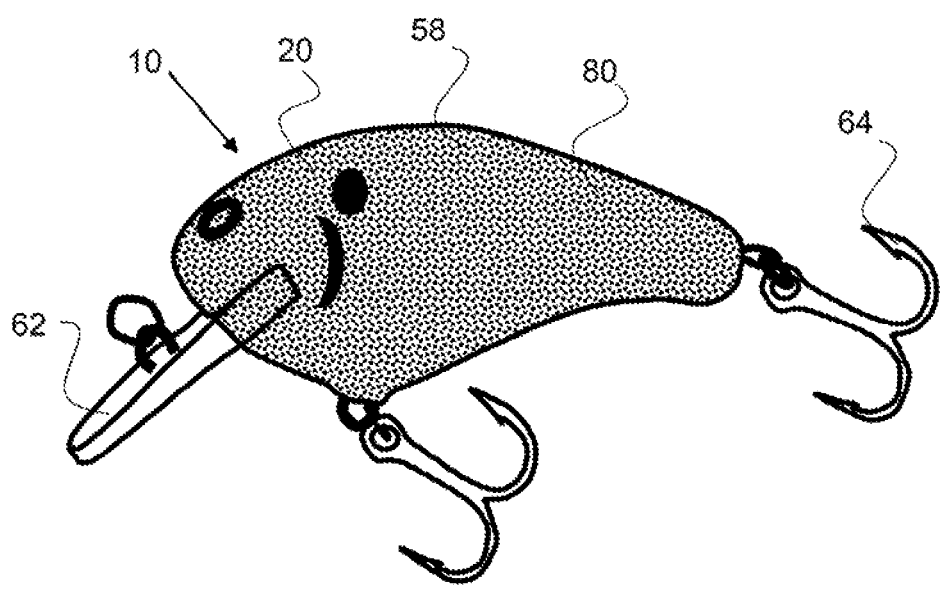

FIG. 8 shows an exemplary powder scented plastic fishing lure, a plug or crankbait, is an over-molded powder scented plastic fishing lure.

Figure 9:
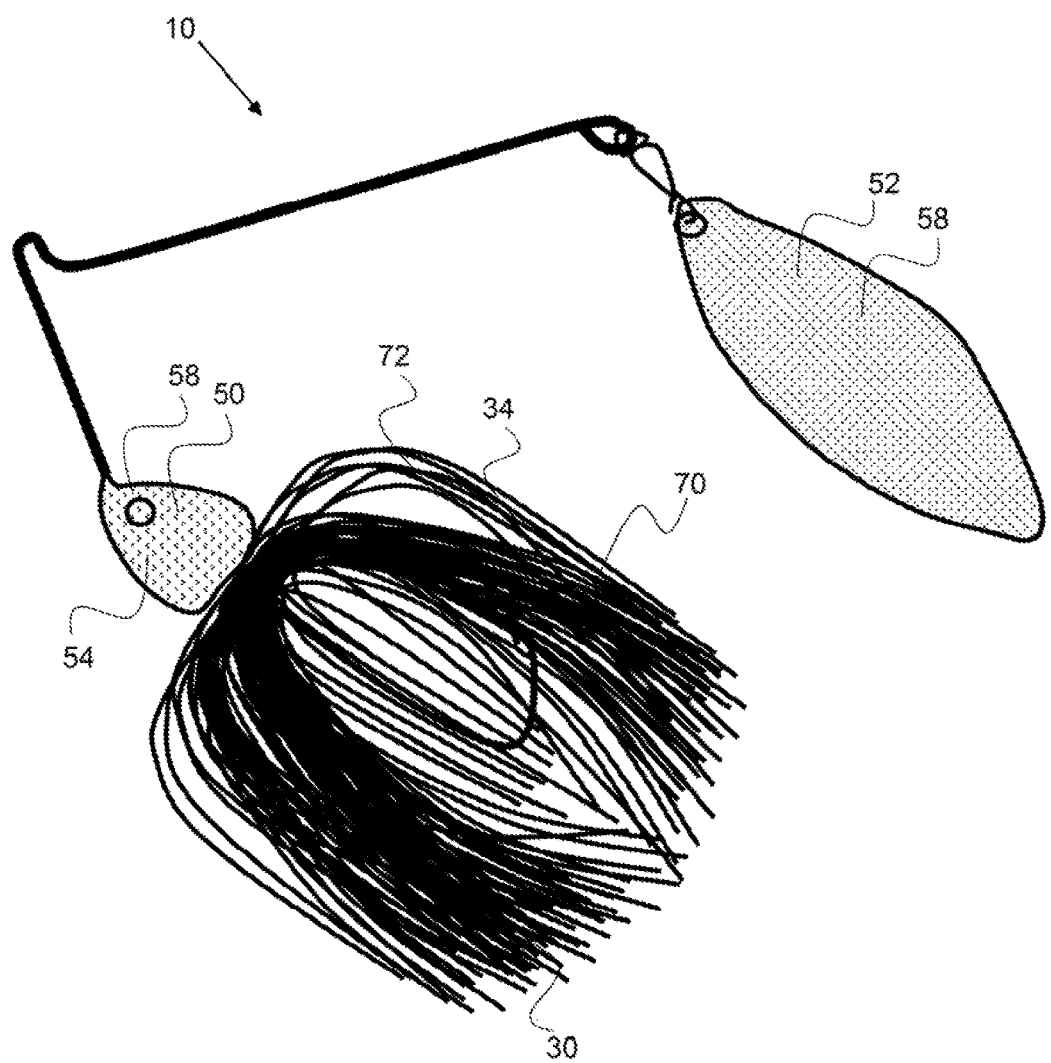

FIG. 9 shows an exemplary spinner type fishing lure having a skirt comprising a powder scented plastic.

Figure 10:
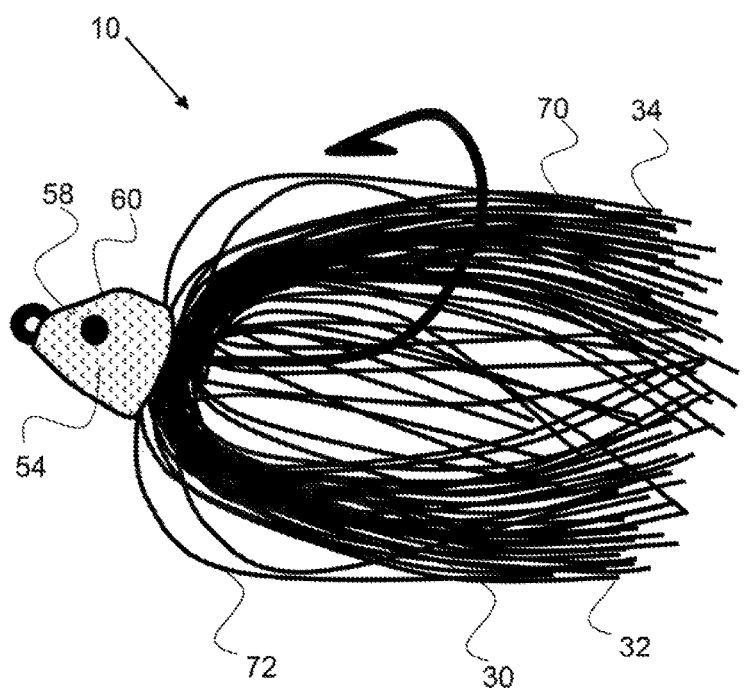

FIG. 10 shows an exemplary jig type fishing lure having a skirt comprising a powder scented plastic.

Figure 11:
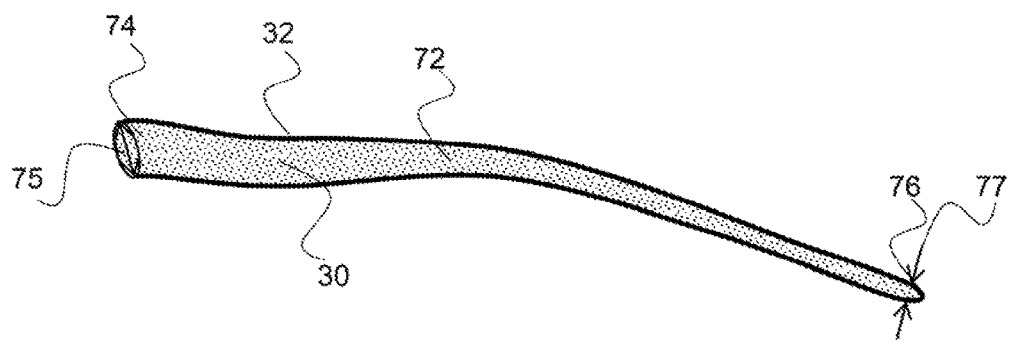

FIG. 11 shows an exemplary skirt strand having a change in cross dimension, i.e., diameter, width or thickness, along the length.

Figure 12:
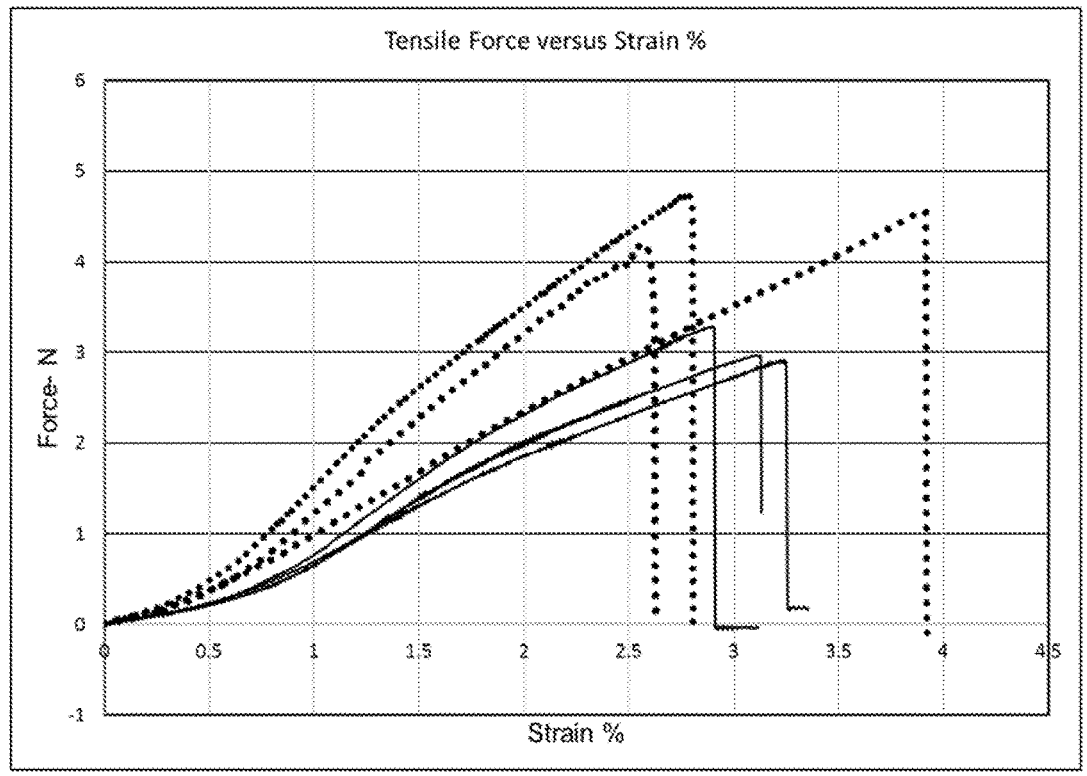

FIG. 12 is a graph showing the force versus strain for two lures made with different plastic compositions.

Figure 13:
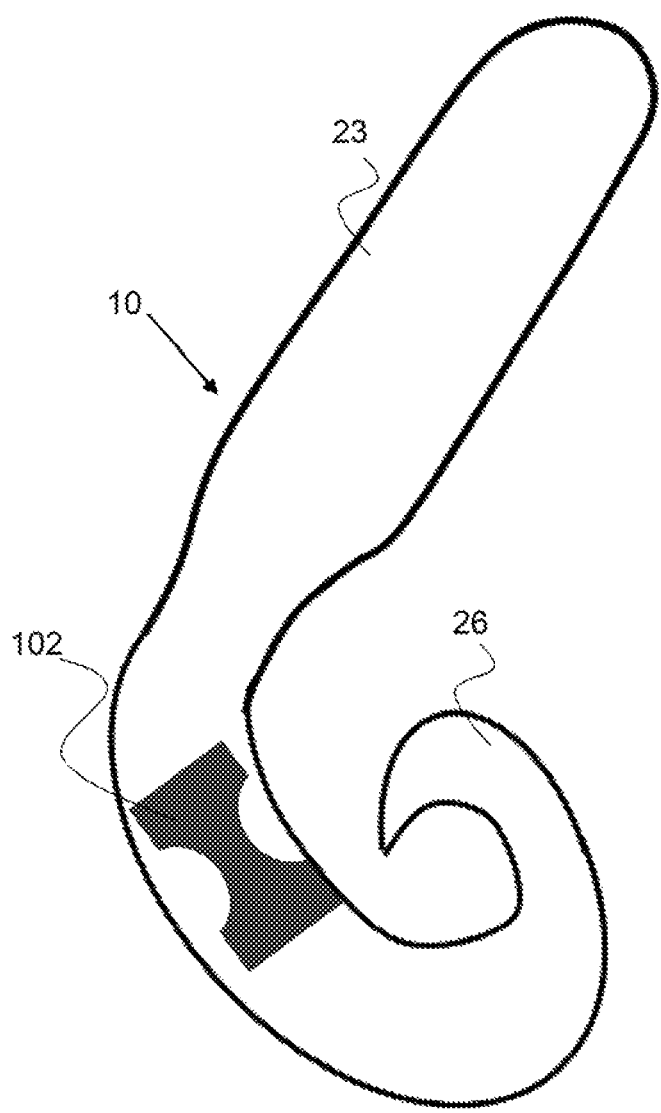

FIG. 13 shows a lure and a tensile sample cut-out location on the tail portion of the lure.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, the flow chart shows the flow of the steps described herein to produce a powder scented plastic fishing lure. A scent material is processed by drying, grinding and screening before it is substantially dispersed throughout a melted moldable thermoplastic. The combined material is then added to a mold and cooled to produce a powder scented plastic fishing lure.

As shown in FIG. 2, the flow chart shows the flow of the steps described herein to produce a powder scented plastic fishing lure having a secondary polymeric component that reinforces the moldable thermoplastic. The moldable thermoplastic and secondary polymeric component are added prior to heating, however, they may be mixed during the heating step. A scent material is processed by drying, grinding and screening before it is substantially dispersed throughout a melted polymeric mixture. The combined material is then added to a mold and cooled to produce a powder scented plastic fishing lure.

As shown in FIG. 3, an exemplary fishing lure 10 is in the shape of straight tail worm 22. The body 20 of the fishing lure comprises a concentration of the scent powder. The body is made up of a powder scented plastic 34, as described herein.

As shown in FIG. 4, an exemplary fishing lure 10 is in the shape of curly tail worm 23. The body 20 of the fishing lure comprises a concentration of the scent powder.

FIG. 5 shows a cross-section view taken along line AA of FIG. 2 having the scent powder 30 substantially dispersed throughout plastic 32 within the body 20 of the fishing lure 10.

FIG. 6 shows a cross-section view taken along line BB of FIG. 4 having a non-screened scent powder dispersed throughout the body 20 of the fishing lure and larger particles 40 embedded within the plastic 32. These large particles 40, 40' can develop air gaps 42 that can compromise the mechanical durability of the lure. The air gaps or voids can lead to splits 44 that extend to the outer perimeter of the lure and eventually result in a break.

As shown in FIG. 7 shows an exemplary powder scented plastic fishing lure 10 is the shape of a fish 24. Again, a powder scented plastic fishing lure can be made in any suitable shape as described herein.

As shown in FIG. 8, an exemplary powder scented plastic fishing lure 10, a plug or crankbait 80, is an over-molded powder scented plastic fishing lure 58. The body of the lure 20 has the power scented plastic over-molded thereon. As described herein, the weight percent or concentration of the scented powder may be higher in an over-molded application as the plastic is mechanically supported by the lure body. Any portion of the lure may be over-molded with powder scented plastic including the bill 62 or hooks 64.

FIG. 9 shows an exemplary spinner type fishing lure 50 having a skirt 70 comprising a powder scented plastic 34 and a spinner 52. The skirt 70 is made of a plurality of skirt strands 72. A plurality of the skirt stands may comprise the powder scented plastic 34, as described herein. In an exemplary embodiment, all of the skirt strands are made out of the powder scented plastic. The head 54 and the spinner 54 of the fishing lure comprise over-molded powder scented plastic 58. The spinner 52 may be an ideal location to over-mold the powder scented plastic as it waves and moves through the water in a dynamic way with respect to the rest of the lure and may more effectively disperse the scent into the water. An over-molded spinner may have powder scented plastic on one side, or substantially covering the spinner wherein the powder scented plastic is on both sides.

FIG. 10 shows an exemplary jig type fishing lure 60 having a skirt 70 comprising a powder scented plastic 34. The skirt 70 is made of a plurality of skirt strands 72. A plurality of the skirt stands may comprise the powder scented plastic 34, as described herein. In an exemplary embodiment, all of the skirt strands are made out of the powder scented plastic. Again, the head 54 of the fishing lure comprises to over-mold the powder scented plastic 58.

FIG. 11 shows an exemplary skirt strand 72 having a change in cross-length dimension, such as diameter, width or thickness, along the length from a first end 74 to a second end 76. The cross-length dimension of the first end 75 is larger than the cross-length dimension of the second end 77. The first end may be attached to the lure and the second end may be an extended end that is free to move or wave as the lure is pulled through the water. As shown in FIG. 9, the first attached end is larger in cross-length dimension 74 than the cross-length dimension of the second end 77 and the skirt strand is tapered from the first attached end to the second extended end. This configuration may provide for a more durable attachment of the skirt strand to the lure and a more flexible extended end that more easily moves at the lure is moved through the water, to attract fish.

As shown in FIG. 12 and as detailed in Table 2, below, the Version-2 lure was much stronger than the original lure. The original lure was made with Regular Liquid Plastic, available from M-F Manufacturing Co., Inc. Fort Worth, Tex. The Version-2 lure was made with a plastic composition of the Regular Liquid Plastic, at about 83% by weight and a secondary polymeric component added at about 17% by weight. The additive was Polypropylene Glycol, Pluriol P 1000 from BASF Inc., Florham Park, N.J. The plastics were blended prior to heating and the Version-2 plastic was heated to 300-350° F. for about four minutes before being poured into the mold. The Regular Liquid Plastic was heated to 300-350° F. for about three minutes before being poured into the mold.

A sample, "Dog-Bone" tensile sample 102 was cut from the tail portion 26 of the curly tail worm 23, lure 10, as shown in FIG. 13. The tail portion of the lure is a flat slab of material having substantially uniform thickness of about 0.09 inch. The samples were tested according to ASTM D-412-15a, Standard Test Methods for Vulcanized Rubber and Thermoplastic Elastomers—Tension; the entirety of said method is hereby incorporated by reference. The samples were pulled at 1 mm/second and the force and strain were recorded. The max load of Version-2 was about 45% higher than the max load of the Original sample. This is very large improvement in the max load which will result in more durable lures that will not break or rip after repeated strikes from fish. In addition, the addition of scent powder may reduce the strength of the lure and addition of an additive that strengthens the plastic may be desirable.

TABLE 2

|  | Original Max Load | Version 2 Max Load |
|---|---|---|
|  | 2.97 | 4.746 |
|  | 2.916 | 4.186 |
|  | 3.283 | 4.558 |
| Average | 3.1 | 4.5 |

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of forming a powder scented plastic fishing lure comprising the steps of:
   a) providing a scent material;
   b) providing a moldable thermoplastic;
   c) providing a fishing lure mold;
   d) drying the scent material to produce a dried scent material having a percent moisture of no more than 2%;
   e) coarse grinding the dried scent material;
   f) fine grinding the dried scent material to produce scent powder;
   g) passing the scent powder through a 50 mesh screen or smaller to produce a filtered scent powder having substantially no particles with a size greater than 300 um;
   h) heating the moldable thermoplastic to a molding temperature;
   i) combining the filtered scent powder with the heated moldable thermoplastic to produce a scented molding plastic;
   j) introducing the scented molding plastic into the fishing lure mold; and
   k) allowing the scented molding plastic to cool and become a powder scented plastic fishing lure.

2. The method of forming a powder scented plastic fishing lure of claim 1, wherein the scent material is derived from a live animal.

3. The method of forming a powder scented plastic fishing lure of claim 2, wherein the scent material is derived from the group of animals consisting of: fish, crawfish, eels, worms, maggots, flies, squid, octopus, leeches, beef, and chicken.

4. The method of forming a powder scented plastic fishing lure of claim 1, wherein the scent material is derived from a live plant.

5. The method of forming a powder scented plastic fishing lure of claim 1, wherein the step of drying the scent material to produce a dried scent material comprises sun drying of the scent material.

6. The method of forming a powder scented plastic fishing lure of claim 1, wherein the powder scented plastic fishing lure consists essentially of said moldable thermoplastic and said scent power.

7. The method of forming a powder scented plastic fishing lure of claim 1, wherein the step of filling the fishing lure mold is performed within 10 minutes of the step of combing the filtered scent powder with the heated moldable thermoplastic.

8. The method of forming a powder scented plastic fishing lure of claim 1, wherein the step of filling the fishing lure mold is performed within 5 minutes of the step of combing the filtered scent powder with the heated moldable thermoplastic.

9. The method of forming a powder scented plastic fishing lure of claim 1, wherein the moldable thermoplastic is heated to a temperature of at least 300° F. during the step of heating the moldable thermoplastic to a molding temperature.

10. The method of forming a powder scented plastic fishing lure of claim 1, wherein an amount of filtered scent powder combined with the heated moldable thermoplastic is between about 0.01 g and 0.25 g per gram of heat moldable thermoplastic.

11. The method of forming a powder scented plastic fishing lure of claim 1, wherein the fishing lure mold has a worm mold shape configured to produce a worm shaped powder scented plastic fishing lure.

12. The method of forming a powder scented plastic fishing lure of claim 1, further comprising the step of providing a fishing lure portion and locating said fishing lure portion into said mold; whereby the steps of introducing the scented molding plastic into the fishing lure mold and allowing the scented molding plastic to cool produces an over-molded fishing lure portion.

13. The method of forming a powder scented plastic fishing lure of claim 1, further comprising the step of adding a secondary polymeric component to the moldable thermoplastic, whereby the secondary polymeric component reinforces the moldable thermoplastic.

14. The method of forming a powder scented plastic fishing lure of claim 13, wherein the secondary polymeric component is added at no more than about 30% by weight of the moldable thermoplastic.

* * * * *